United States Patent [19]

Ohnishi et al.

[11] Patent Number: 4,987,603
[45] Date of Patent: Jan. 22, 1991

[54] RECOGNITION METHOD FOR LETTER PATTERNS

[75] Inventors: Kazuhiko Ohnishi; Shoji Miki; Yasuo Fujita; Hiroki Tsubota, all of Himeji; Katsuji Uosaki, Kobe, all of Japan

[73] Assignee: Glory Kogyo Kabushiki Kaisha, Hyogo, Japan

[21] Appl. No.: 247,664

[22] Filed: Sep. 22, 1988

[51] Int. Cl.⁵ ............................................. G06K 9/52
[52] U.S. Cl. ...................................... 382/25; 382/26; 382/34
[58] Field of Search ................. 382/25, 26, 13, 21, 382/38, 34

[56] References Cited

U.S. PATENT DOCUMENTS

| | | | |
|---|---|---|---|
| 4,468,808 | 8/1984 | Mori et al. | 382/20 |
| 4,630,306 | 12/1986 | West et al. | 382/21 |
| 4,654,873 | 3/1987 | Fujisawa et al. | 382/38 |
| 4,680,804 | 7/1987 | Kuzunuki et al. | 382/13 |
| 4,718,103 | 1/1988 | Shojima et al. | 382/13 |

FOREIGN PATENT DOCUMENTS

0079251 5/1983 European Pat. Off. .

Primary Examiner—David K. Moore
Assistant Examiner—Yon Jung
Attorney, Agent, or Firm—Wenderoth, Lind & Ponack

[57] ABSTRACT

A letter pattern recognition method preprocesses each character pattern to effect characteristic extraction based on elements such as a loop, a straight line and an arc and is adapted to compare the character pattern with a preregistered classification code after the normalization thereof, the character pattern being subjected to balance and stroke checks if necessary as a result of the comparison. Notwithstanding this, if the character is not defined, the character pattern is identified by means of detail classifications such as those of a divergent mode of the arc, and a length ratio of the elements and the like.

15 Claims, 9 Drawing Sheets

RECOGNITION METHOD FOR LETTER PATTERNS

BACKGROUND OF THE INVENTION

This invention relates to a letter pattern recognition system for identifying characters, particularly, characters such as handwritten figures.

In the field of OCR (Optical character reader) art, a handwritten figure recognition algorithm for reading figures written in a predetermined blank space has almost been perfected. From the standpoint of the level of existing readers that have been put into practical use, recognition of figures that are handwritten normally and freely without paying attention to the style of the figures being read by an OCR is still unsatisfactory as compared to the human eye.

One of the conventional character pattern recognition systems is that shown in Japanese Patent Publication No. 41943/1978, which serves as an example. This system is adapted to resolve each character pattern into specific elements according to a detailed classification so that the character pattern may be identified by the frequency of occurrence of longitudinal lengths or horizontal lengths in the elements. This feature is disadvantageous in that the reliability of recognition is low. The other type of pattern recognition system is disclosed in Japanese Patent Publication No. 26975/1984. The other disclosed pattern recognition system is based on a taxonomic logic whereby each character pattern is classified into one of several large groups, depending upon whether or not it is shaped into a loop, a cap or a cap form, and is then further classified into one of several smaller groups. In this instance, the detailed classification relies upon application of the frequency of occurrence of longitudinal lengths or horizontal lengths of the specific elements, thus resulting in poor functionability or capacity.

SUMMARY OF THE INVENTION

The present invention is provided as a result of the aforementioned circumstances. It is an object of the present invention to provide a pattern recognition method which is capable of efficiently and positively identifying handwritten characters to be read by an OCR without paying attention to the style thereof.

DESCRIPTION OF THE PREFERRED EMBODIMENTS

According to the present invention, the characteristic features of a letter (character) pattern are classified into such elements as straight lines, and arcs such as to provide for characteristic extraction. At the same time, a character which cannot be specified in comparison with a preregistered classification code is subjected to checking of the balance and stroke aspects. At the same time, if a character cannot yet be specified in the aforementioned manner, it is next subjected to detailed classification of such aspects as divergent mode or orientation of arcs so that a character such as a handwritten figure may be efficiently and positively identified.

Figure 2A:
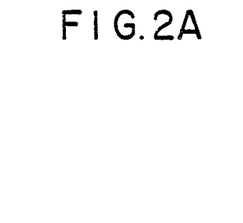
FIGS. 2A and 2B are views of one form of a handwritten figure.
Figure 2B:
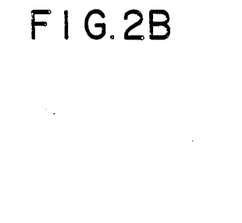
Figure 3A:
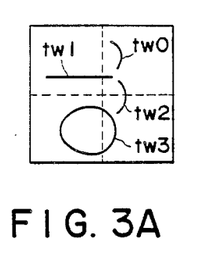
FIGS. 3A and 3B are representations of a normalized characteristic element.

The present invention is designed to classify a handwritten figure such as that, for example, shown in FIG. 2A into three elements as shown in FIG. 3A such as arcs tw0, tw2, a straight line tw1, and a loop (circular shape) tw3, this serving as a method of extracting characteristic features, that is, the so called characteristic extraction method. These characteristic features are coded and then compared with preregistered classification codes so as to allow identification of character patterns. Each of the elements consists of a branch and a node, the former being a segment connected to the node, the latter being a branch point or an end point of the pattern. Similarly, the handwritten figure shown in FIG. 2B is resolved into the three elements shown in FIG. 3B, namely arcs w0, w3, a straight line w1, and a loop w2. More specifically, the present invention is intended to allow for reading of handwritten figures by a reading means formed from an image sensor such as a charge coupled device (CCD) and then to carry out preprocesses such as smoothing and fine linearization. In this way, the pattern alloted to a predetermined block is resolved into three elements, such as loops, straight lines and arcs, thus allowing the character pattern to be identified when coded in comparison with classification codes which are preregistered as a data base established on the basis of the presence of respective elements as well as the relative positional relationship thereof, the orientation of the straight lines, the divergent mode of arcs, the weight of elements, etc.

Figure 1:
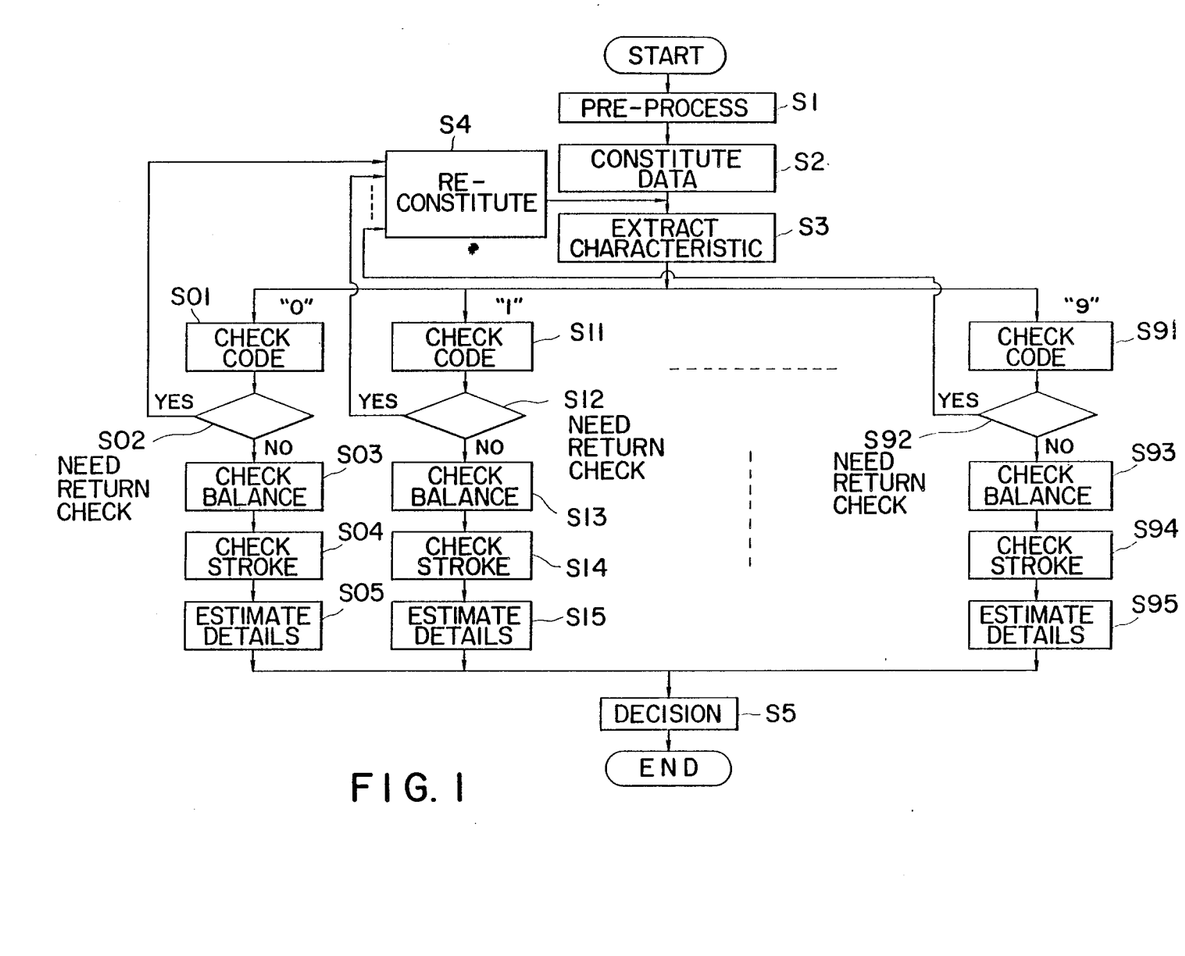
FIG. 1 is a flow chart showing the entire operation of a system according to the present invention.

FIG. 1 is a flow chart shown in the entire operation of a system according to the present invention, wherein a handwritten character is read by a reading means and is then electrically subjected to preprocesses (Step S1) such as smoothing and fine linearization. After such preprocesses have been performed, a data constitution step (Step S2) is effected while the character is being resolved into the three elements mentioned above and then coded for extraction of characteristic features (Step S3). The character is then compared with classification codes such as "0" to "9" which have been preregistered. More specifically, each of the characteristic codes which have been read and formed is compared with the respective classification codes such as the numerals "0" to "9" such as to effect code checking (Steps S01, S11 ..., S91) in parallel with the comparison. This code check is effected on the all of the numerals "0" to "9" together. Decisions (Steps S02, S12 . . . , S92) are made as to whether a return check, as will be referred to later, is needed with respect to anticipated numerals after each code check. If a return check is needed, the data is constructed (Step S4) with respect to the anticipated numerals and is then again subjected to characteristic extraction and the same processes as aforementioned. If a return check is not needed, balance checks (Steps S03, S13, . . . , S93), stroke checks (Steps S04, S14, . . . , S94) and other detailed estimations (Steps S05, S15, . . . , S95) are effected with respect to the anticipated numerals to allow the final decision to be made. In this connection, it is noted that if only one pattern is identified in "0" to "9", the identified numeral is decided as the recognition pattern, whereas if more than two patterns are present the decision is rejected.

The operation will be understood from a reading of the following explanation.

Extraction of a loop is done by a linear pattern follow-up algorithm. In this respect, a "loop" is meant to refer to a pattern which forms a closed loop composed of more than one branch. For the convenience of illustration lp1 is given as a characteristic code, and weights 0–1 and the center of gravity cg(x,y) are considered as parameters. The weights 0–1 are representative of the percentages covered by loops with respect to the dimensions of all the character patterns being examined, and the length is indicative of the number of chain codes. The "chain codes" are represented by the numbers "1"–"8" which are applied to the light directions shown in FIG. 5. The center of gravity cg is indicative of the position of the center of gravity loop in terms of x and y coordinates.

Figure 4:
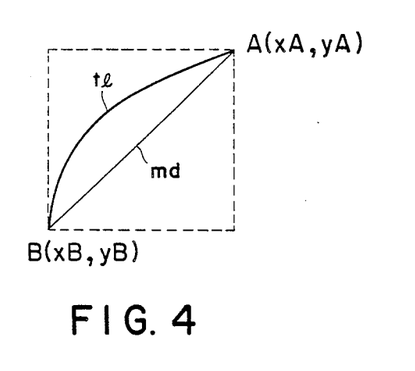
FIG. 4 is a representation of a straight line as a segment of the figure.

A straight line is extracted if it includes a branch formed from two points A and B (nodes) as shown in FIG. 4, thus determining the branch tl to be a straight line when the length of the branch is tl, and the shortest distance between A and B is md to obtain the following equation:

$$\alpha \cdot md \geq tl \quad (1)$$

where
  $\alpha$: straight line decision coefficient, for example, 1.2

$$md = \sqrt{2} \times \min(xl, yl) + |xl - yl|$$
$$xl = |x_A - x_B|$$
$$yl = |y_A - y_B|$$

$$tl = \sum_{n=1}^{Cn} Cl_n$$

$C_n$: number of chain codes
$Cl_n$:
  1 (when the chain code is 1, 3, 5 or 7 in number)
  $\sqrt{2}$ (when the chain code is 2, 4, 6 or 8 in number).

Figure 5:
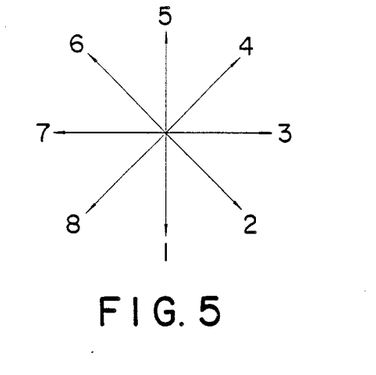
FIG. 5 is a view explanatory of a chain code of the present invention.

In this instance, md serves to substitute the aforementioned equation instead of setting up $\sqrt{(x_A-x_B)^2+(y_A-y_B)^2}$. Next, a rectilinear direction is calculated in such a manner that the chain codes 1,5; 2,6; 3,7; 4,8 are arranged from a vector $\vec{BA}$ to radiate in eight directions 1–8 such as to designate rectilinear directions 1, 2, 3 and 4 as shown in FIG. 5. Consequently, a characteristic code of the straight line is expressed in stn, n being given in FIGS. 1–4 as st1–st4. The weight 0–1 and the center of gravity cg(x,y) are applied as the parameters. The weight of the linear line is given in the form of a numerical value between 0 and 1 (such as 0.72) with respect to the relevant percentage of all the character patterns.

Figure 6:
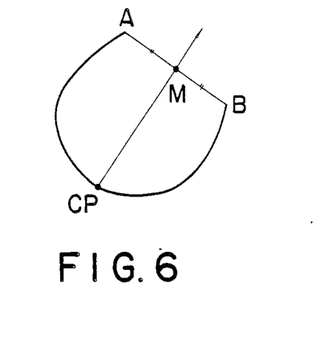
FIG. 6 is a representation of the divergent mode or orientation of an arc as well as the degree of divergence thereof.

An arc is considered as a characteristic element different from loops and straight lines. The characteristic code acnm is employed for arcs. In this instance, n designates a divergent mode or direction of arc, to which numerals 1–8 are assigned in accordance with FIG. 5. A legend "m" is used to show the size of the open part of an arc, to which numerals 1–5 are assigned. More specifically, the divergent mode or orientation of the arc is such that the arc is oriented to follow a line which extends from a middle point CP of the arc to middle point M of a segment AB which represent the end points of the node of the arc as shown in FIG. 6. Numerals given to the respective divergent orientations of the arc correspond to the chain codes 1–8 as shown in FIG. 5, wherein the coordinates of the points A are set as (xA, yA) and the other coordinates of the point B are put as (xB, yB), whereby the coordinates of the middle point M would be formulated as follows;

$$M\left(\frac{xA + xB}{2}, \frac{yA + yB}{2}\right)$$

The direction of a segment connecting the point CP with the point M would be expressed by $$\overrightarrow{CP \cdot M}\left(\frac{xA + xB}{2} - x_{CP}, \frac{yA + yB}{2} - y_{CP}\right) = \quad (2)$$

$$\overrightarrow{CP \cdot M}(xd, yd)$$

where $xd = \frac{xA + xB}{2} - x_{CP}$ $yd = \frac{yA + yB}{2} - y_{CP}$ wherein d=yd/xd is given, and the divergent direction n would be formulated as follows:

$$\begin{cases} n = 1: xd > 0, d \geq 2.414; xd < 0, d < -2.414; xd = 0, yd > 0 \\ n = 2: xd > 0, 0.414 \leq d < 2.414 \\ n = 3: xd > 0, -0.414 \leq d < 0.414 \\ n = 4: xd > 0, -2.414 \leq d < -0.414 \\ n = 5: xd > 0, d < -2.414; xd < 0, d \geq 2.414; xd = 0, yd < 0 \\ n = 6: xd < 0, 0.414 \leq d < 2.414 \\ n = 7: xd < 0, -0.414 \leq d < 0.414 \\ n = 8: xd < 0, -2.414 \leq d < -0.414 \\ n = 9: x = y = 0 \end{cases}$$

The opening amount m or size of the opening part of the arc is expressed by ol/(tl+ol) when the lengths of the segments $\overrightarrow{AB}$ and $\overrightarrow{AB}$ are set as tl and ol, respectively, as shown in FIG. 6. The opening amount m is also designated by "1", "2", "3", "4" and "5" when the formula, ol/(tl+ol) results in 0.0–0.1, 0.1–0.2, 0.2–0.3, 0.3–0.4, and 0.4–0.5, respectively. The parameter of the arc is determined by the weight 0–1 and the center of gravity cg(x,y) in the same manner as in the cases of a loop and a straight line.

Figure 8:
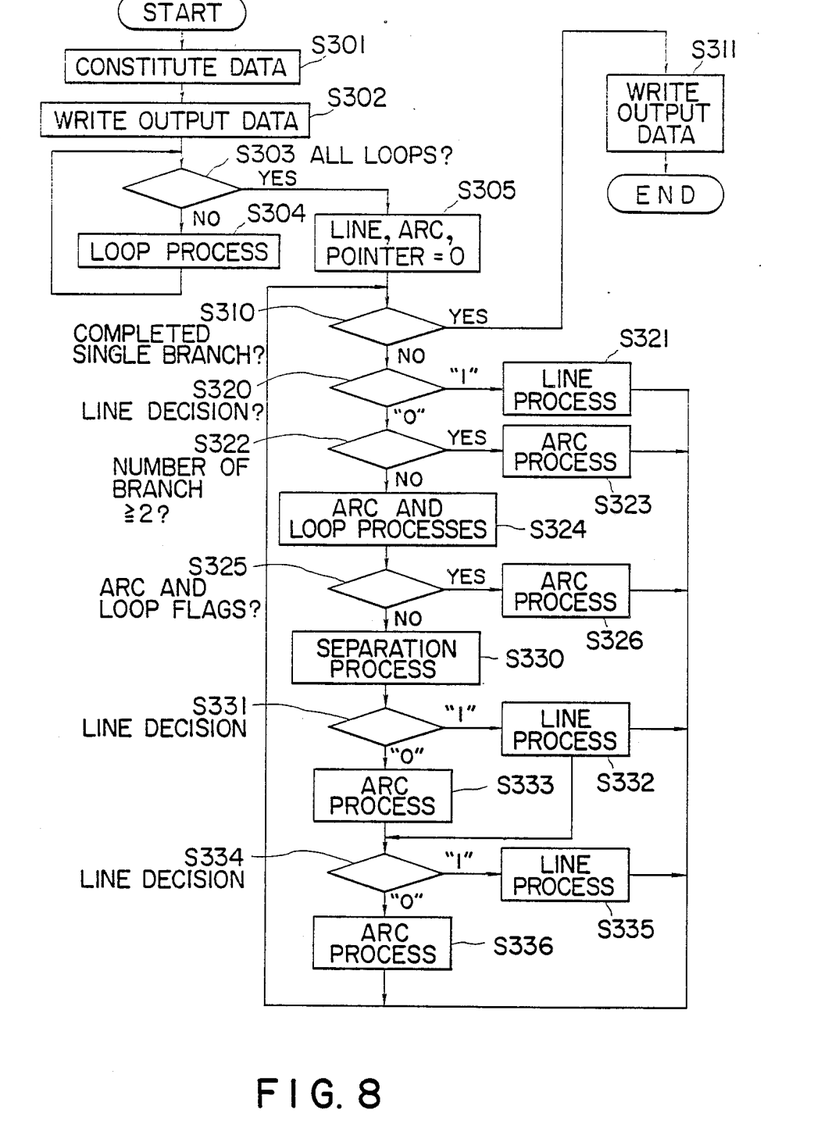
FIG. 8 is a flow chart showing one example of the operations conducted in the characteristic extraction process of the present invention.

The operation of characteristic extraction as set forth hereinbefore is sequenced as shown in the flow chart shown in FIG. 8, wherein the data are constituted (Step S301) and the output data are written (Step S302) such as to define the maximum processing region in the x and y coordinates. The center of gravity and the weight are obtained from each of the loops, and then the straight lines and arcs are processed starting from the initial value (0) (Step S305) after completion of processing on all of the loops (Steps S303, S304). Any branch other than those which form a loop is called a "single branch". When a process for the single branches is fully completed, the output data such as all the data regions, the number of loops, straight lines and arcs, the weight of each of the straight lines and arcs, and the center of gravity are written in a memory, the process then coming to an end (Steps S310, S311).

Figure 17:
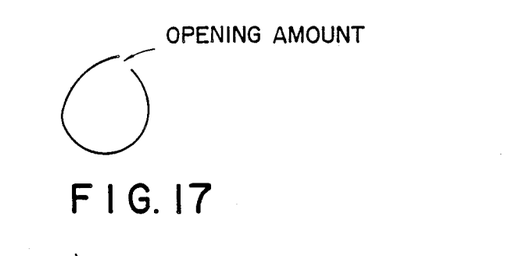

In contrast, if the process for the single branches is not fully completed, a decision is made as to whether the branch is linear or not (Step S320), and if this result indicates a linear line, the straight-line process (Step S321) is then carried out. If the decision indicates that the branch is not linear, it is determined whether or not the number of single branches is "2" or more (Step S322). If it is "2" or more, the arc process is carried out (Step S323), whereas if it is "1", the arc and loop flag process (Step S324) is performed. What is called an "arc flag process" is a process performed in such a manner that, when a figure is like that shown in FIG. 17, that is when the amount of opening or gap between the two end points is less than a predetermined value, the figure is presumed to be "0" and no "separation process" of the kind described later is carried out. When this gap is found in the aforementioned manner to result in a dimension of, for example, less than "0.2", an arc flag is displayed.

Figure 18:
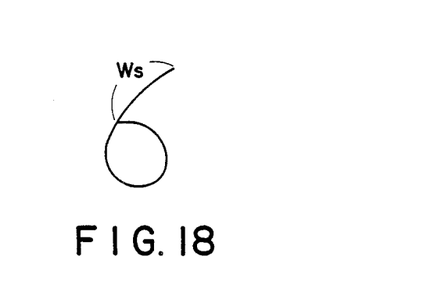

What is called a "loop flag process" is a process employed in such a manner that, when a figure is like that shown in FIG. 18, that is, the weight of the part of the single branch that excludes the loop is less than a predetermined value, the figure is presumed to be "6" and no "separation process" of the kind described later is carried out. When the weight is, for example, less than "0.4", a loop flag is displayed. Next, when it has been decided that an arc or loop flag is to be displayed, an "arc process" is carried out in the case of either flag (Step S325), but where no flag is displayed the branch is subjected to a separation process (Step S330).

Figure 7:
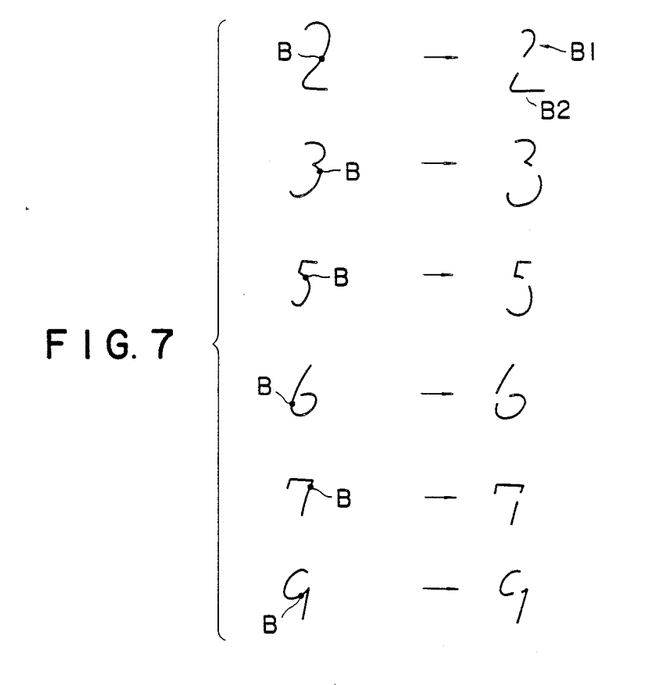
FIG. 7 is a representation of the discontinuous portion of handwritten figures.

This separation process is meant to refer to a process of separating a non-rectilinear pattern (cross pattern) of the kind represented by the handwritten figure shown on the left of FIG. 7, that is, one branch with a single stroke divided into two. Should the cross pattern as it is to be identified without separation, it would be a complete arc, since it is not formed with a straight line or loop; this involves some difficulty in an identification. Then, a cross section of the sort referred to above is normally adapted to be separated at the center B of the length of its segment for characteristic extraction. After separation, one element so separated is identified to determine whether it is a straight line or not. If it is identified as a straight line, it is then subjected to a straight-line process (Step S332). If not, it is subjected to an arc process (Step S333). To take "2" shown in FIG. 7 as an example, it is separated at the middle point B into two and then subjected to the arc process to obtain two arcs B1 and B2. These two processes are repeated for all the single branches.

Figure 9A:
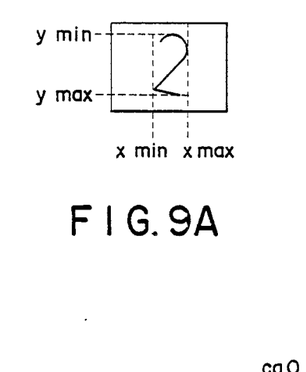
FIGS. 9A and 9B, and FIG. 10 are views explanatory of the normalization process of the present invention.
Figure 9B:
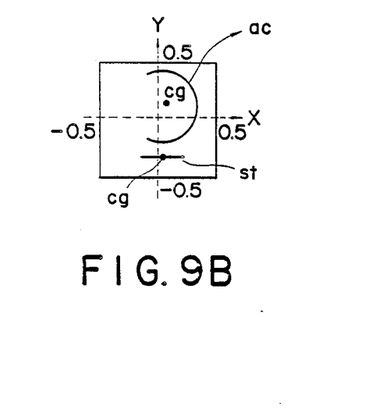

Since any difference in the position of the center of gravity derived from the dimensions of the handwritten character is undesirable, the characteristic data are normalized after characteristic extraction by the aforementioned process so as to be ready for a comparative process without fail at any time. Although the position of the center of gravity of the characteristic element is normalized, there are many variations in terms of modification of the style in which the character is written. The variations in the position of the center may be absorbed by using relative positions (upper, down, left, and right) between the centers of gravity of the characteristic patterns. More specifically, a characteristic is extracted from the original data as shown in FIG. 9A such as to obtain "ac73, weight 0.7, cg(x1, y1)", and "st3, weight 0.3, cg(x2, y2)". When they are normalized, they are then plotted on a discriminated space map as shown in FIG. 9B. This is expressed by a formula as in the following:

$$Sv = \max\{(xmax - xmin), (ymax - ymin)\}$$

$$xv = \frac{xmax + xmin}{2}$$

$$yv = \frac{ymax + ymin}{2}$$

This may be converted to the following formula by mapping $$\begin{cases} X = (x - xv) \cdot \frac{1}{Sv} \\ Y = (y - yv) \cdot \frac{1}{Sv} \end{cases}$$

Figure 10:
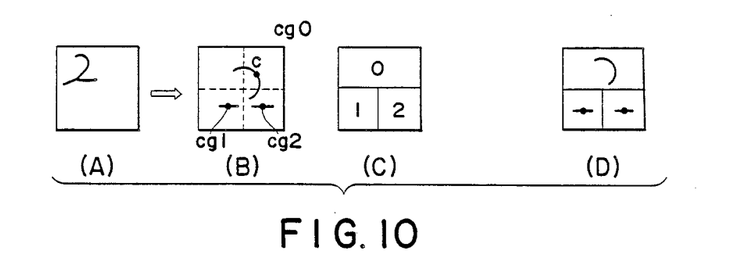
Figure 11:
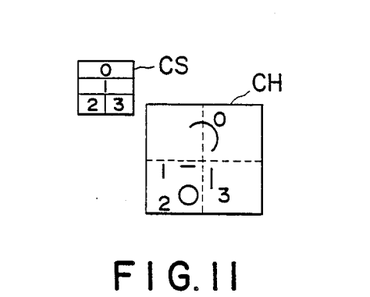
FIG. 11 is a representation of a characteristic space utilized in the present invention.

"Mapping" for the discriminated space is meant to refer to a primary conversion of the position cg of the center of gravity of the characteristic element from the x and y coordinates to the X and Y coordinates. As shown in FIG. 10, the characteristic space consists of an original data (A), characteristic data (B), and a group of elements (C). More specifically, the characteristic space is shifted from the original data (A) and the characteristic data (B) to the group of elements (C) which includes the top element and the left and right elements positioned downwardly thereof. The basis of a classification code is created in such a manner that a value for each of the elements (for example, the orientation of the upper arc is numbered as 8, and the size is 0.3, the directions of the line running toward the left and right-bottoms are respectively evaluated as 3) and the dimension between the centers of gravity (for example, the differences in y between the centers cg0, cg1 of gravity and between the centers cg0, cg2 of gravity are respectively more than $\alpha$, and the other difference in y between the centers cg1 and cg2 is less than $\beta$ and the difference in x thereof is more than $\gamma$), is given such as to frame a classification code as a broad classification. An elementary number n may be employed as such a classification code. Let i be an item for the element. This item consists of a straight line st, an arc ac, and a loop lp. Let d, w, and x, y be the direction of the element (straight line or arc), the weight, and the x and y coordinates (normalized value) for the position. Thus, for example, a formula n=4 is applied to a characteristic CH and a characteristic space CS shown in FIG. 11 accompanied by formulae i0=ac, i1=st, i2=lp, and i3=st so that one of the classification codes may be expressed by means of the following formulae:

$$\begin{cases} n = 4 \\ i0 = ac, i1 = st, i2 = lp, i3 = st, |y_{o2}| \geq |x_{o2}| \\ d0 = 6, 7, 8. \\ d1 = 2, 3, 4 \\ d3 = 1, 2, 4 \\ w0 \geq 0.1 \\ w2 \geq 0.1 \\ w1 \leq 0.25 \end{cases}$$

After characteristic extraction and normalization as aforementioned, a comparison is made between the codes. By comparing the codes in terms of pattern, the anticipated character is prepared. In this instance, it is noted that although figures such as "2" and "2" may be identical with each other in configuration, they are identified by different codes according to the feature extraction of the present invention. It is well known that so called "smudges" which may account for such a difference are very frequently present at the sharp bend portion of a curved line. Consequently, these smudges are eliminated and incorporated in a fresh recognition routine whereby "2" can be idendified as "2" by the code, thereby eliminating the need for a recognition table.

If the figures with a high incidence of smudges are prepared as separation codes, together with such smudges, any of the Steps S202, S12, ..., S92 shown in FIG. 1 may be applied to determine whether a return check is required in the event that the figures correspond to the codes. The return check serves, if required, to eliminate a portion of the smudges or whiskers of the codes such as to reconstitute the data (Step S4) and then resumes the feature extraction (Step S3) for a comparison with the separation code.

The balance check carried out in the present invention will be described with reference to FIGS. 3A and 3B.

Figure 3B:
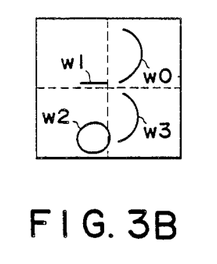

The weights tw0=0.10, tw1=0.25, tw2=0.55, and tw3=0.10 are given to the sample data, as shown in FIG. 3A, whereas the arc w0=0.3, the line w1=0.15, the loop w2=0.30, and the arc w3=0.25 are used for the virtual patterns of the wide classification, as shown in FIG. 3B so that the weight of each of the elements for the sample data against the normal weight may be checked to the extent that it is within the margin as set.

$$C_{no} = \sum_{i=1}^{n} \text{count } \{S_{wi} \times ll < t_{wi} < S_{wi} \times ul\} \quad (3)$$

where "count { }" is used to mean "1" if the logic in the parenthesis is satisfied, but means "0" if not.
Swi=normal weight of the element i
twi=normal weight of the sample data
ul=upper limiting margin (for example, 2.0)
ll=lower limiting margin (for example, 0.5) and
where $C_{no} \leq C_i$ gives a decision of "reject" $C_{no} > C_i$ gives a decision of "OK"
$C_i$=effective area margin set for every elementary number and the value of which is as follows:

| elementary number i | Ci |
|---|---|
| 2 | 0 |
| 3 | 1 |
| 4 | 1 |
| 5 | 2 |
| 6 | 2 |
| 7 | 2 |

The absolute value for deviation quantum between the elementary weight and the normal weight is calculated and estimated according to the following formula in similarity as a result of normalization of the elementary number.

$$S_{wt} = \frac{1}{n} \sum_{i=1}^{n} |S_{wi} - t_{wi}| \quad (4)$$

where $S_{wt} < S_i$ gives a decision of "OK" and $S_{wt} \geq S_i$ gives a decision of "reject".

The balance check of this class is particularly effective in a pattern which contains a great number of elementary numbers.

Figure 12:
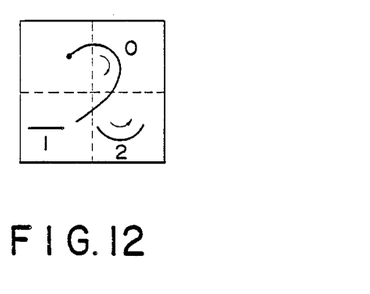
FIGS. 12, 13A, 13B, 14, 15, 16A–16G, 17, 18 and FIGS. 19A–19F are views explanatory of the detailed classifications.

A stroke check is one that is used in deciding the starting point of each of the elements of the anticipated character and then to check the direction of the line, the divergent orientation of the arc, and the linkage structure of the elements on the basis of the starting point. More specifically, the stroke check is carried out in such a manner that the starting point of each of the elements is decided, and that a stroke condition is prepared based on the directions (eight directions) of the line from the starting to the terminal point, the divergent orientation (CW, CCW) of the arc from the starting to the terminal point, the linear directions (eight directions) of the arc from the starting to the terminal point, and the link structure of the elements. The stroke check functions to render the anticipated character if it is not suitable for the stroke condition and thus makes it impossible to proceed with the next classification of detail. For instance, a character or a figure 2 is subjected to an element resolution (0, 1, 2) as shown in FIG. 12. More precisely, an element 0 is expressed as i0 to this obtain formulae i0=arc, i1=straight line, and i2=arc. According to the stroke analysis, the divergent orientation of the arc i0 is determined at the starting point as the upper end point thereof. In this instance, the arc is orientated in the clockwise direction (CW). The element i0 and the elements i1, i2 intersect with each other at one point. The diverging points for the elements i0, i1 and i2 are in accord with each other. The element i1 runs from the end to the diverging point in the linear direction to assume directions 3 or 4 shown in FIG. 5, whereas the element i2 is orientated in the counter clockwise direction (CCW) looking in the direction of the arc at the starting point as the divergent point. An "OK" is given only when the aforementioned conditions are fully satisfied. The necessary conditions are such that the divergent orientation of the element i0 is CW (Condition 1); the element i0 and the elements i1, i2 intersect with each other at one point (Condition 2); the element i1 runs from the end to the divergent point in the linear direction to assume the direction 3 or 4 (Condition 3); and the arc is orientated in the direction CCW at the starting point as the divergent point of the element i2 (Condition 4).

Figure 13A:
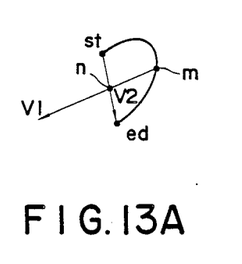
Figure 13B:
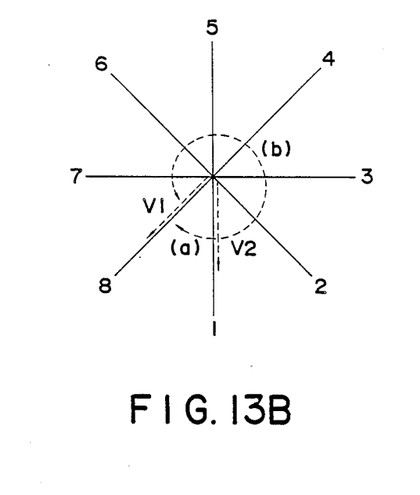

An estimation of detail is formed in such a manner that the divergent orientation of the arc is set with due consideration for the directions of a vector $\vec{V_1}$ for m→n and a vector $\vec{V_2}$ for st→ed when the arc is of the form shown in FIG. 13A, wherein a middle point of a segment between the end points st and ed is put as n. When the vector $\vec{V_2}$ is oriented at "1" and the vector $\vec{V_1}$ is oriented at "8", the vector which is closer to either one of paths (a) and (b) as imagined is employed such as to allow the vector $\vec{V_2}$ to accord with the vector $\vec{V_1}$.

Figure 14:
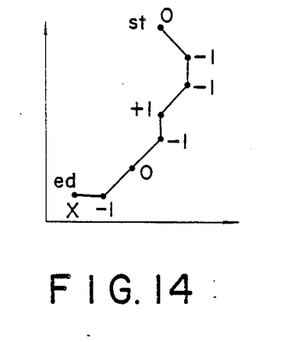

In this instance, the path (a) is located close to the vector so that the latter may be set to the rotational direction of the path (a), that is, the clockwise direction. If the vectors $V_1$ and $V_2$ are different from each other in the angle by 180°, it is not determined which path is close to the vector. For this reason, it is necessary to find the sum of variations in the direction at the respective points arranged from the starting point st to the terminal point ed as shown in FIG. 14. As a result, the clockwise and counter clockwise variations are defined as "negative" and "positive". In this instance, one positive direction is provided with respect to four negative directions so that the sum of the variations is "−3" (negative) at the terminal point set to the clockwise direction.

Figure 15:
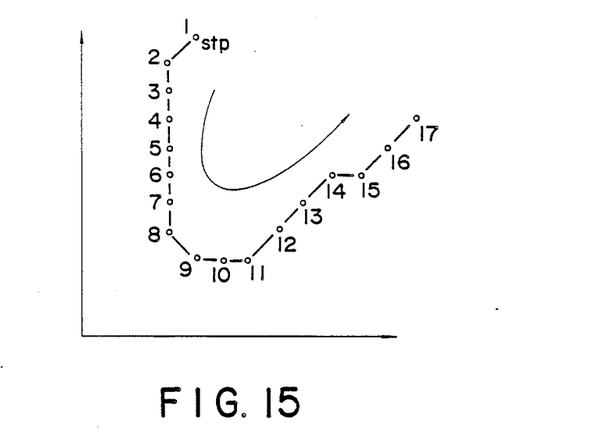

From the point of view of a fine comparison of segments, the maximum point out of the other points where variations show in the straight line and the arc should be found. For extraction of the point of variation in the linear pattern, a manner of such extraction should be dependent on the extent of variation in the curvature. As viewed from the finely linearized data every one bit, they are continuation of variations. According to the maximum point out of the points of variation is found by means of a sample width corresponding to the length and a quadratic differentiation. For example, if there is a group of bits 1∼17 arranged in a column as shown in FIG. 15 and the maximum point in the counter clockwise direction with respect to a starting point stp is obtained, a difference in the directions between the segments with respect to the group of the bits 1∼17 and the five bit samples are plotted in a Table 1 shown hereunder. Although five bits are herein employed as the sample width, any number of the bits may be selected according to the length observing the points of variation, for instance, a plurality of the bit may, of course, be used as a table. For instance, when the points of variation are observed in a group of the four bits, the two bits are applied as the sample width. In the Table 1, the difference "1" in the direction of the bit No. 1 is meant to refer to one difference in the direction counter clockwise upon observation of the difference in the directions between 1→2 and 4→5 as viewed from the five bits 1→5 in FIG. 15. In this connection, it is noted that any difference is made in the direction on and after the 14th of the bit since the five bits are not taken out.

TABLE 1

| Number of group of bits | Direction of segment | Difference in direction |
|---|---|---|
| 1 | 8 | 1 |
| 2 | 1 | 0 |
| 3 | 1 | 0 |
| 4 | 1 | 1 |
| 5 | 1 | 2 |
| 6 | 1 | 2 |
| 7 | 1 | 3 |
| 8 | 2 | 2 |

TABLE 1-continued

| Number of group of bits | Direction of segment | Difference in direction |
|---|---|---|
| 9 | 3 | 1 |
| 10 | 3 | 0 |
| 11 | 4 | 0 |
| 12 | 4 | 0 |
| 13 | 4 | 0 |
| 14 | 3 | inconstant |
| 15 | 4 | inconstant |
| 16 | 4 | inconstant |
| 17 | 0 | inconstant |

It is understood from the Table 1 that there is only a positive group where the median point is used as a typical point in the center of the groups which are polarized (positive or negative) similar to each other with respect to the data of difference in direction, and that the bit No. 6 assumes the median point of the positive groups (the low numbered bit assumes the median point when the bit is an even number).

A formula, $Sx = n + (\text{sample bit})/2 + 1$ is rearranged by substituting "6" for "n" to obtain the formula as follows:

$$Sx = 6 + 5/2 + 1$$
$$= 9.5$$

Where the fraction is discarded to be "9", and the ninth point in FIG. 15 is to be the maximum point of the positive (Counter clockwise).

Figure 16A:
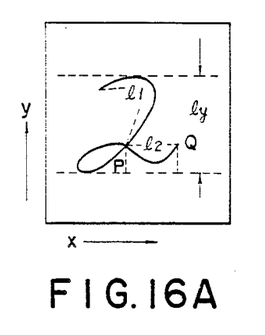

A detailed classification as shown in FIGS. 16A∼16G is made in addition to the arc rotation and the maximum point.

Figure 16B:
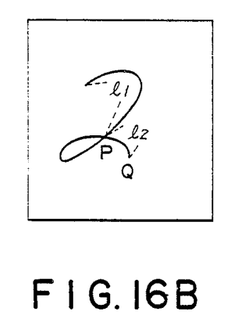
Figure 16C:
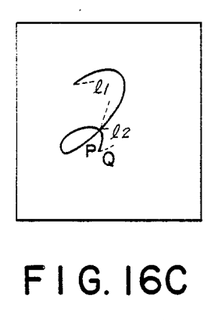
Figure 16D:
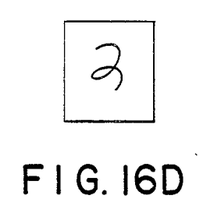
Figure 16E:
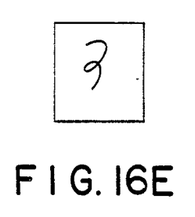
Figure 16F:
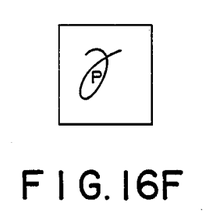
Figure 16G:
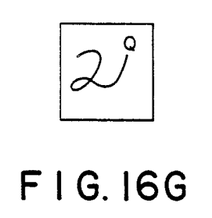

For the purpose eliminating the figures as shown in FIGS. 16F, 16G from what is illustrated in FIGS. 16A∼16C, the following formula is set as a common condition.

$$\left. \begin{array}{l} Py/ly < 0.55, \text{ and} \\ Qy/ly < 0.78 \end{array} \right\} \quad (5)$$

where
Py: y coordinate of P
Qy: y coordinate of Q
ly: length in y direction.

More specifically, the figures which are written in such a manner that the points P and Q are raised to an undue extent, are eliminated in accordance with the condition (5). In FIG. 16A, where a segment $l_2$ forms an arc counter clockwise oriented, and $\vec{PQ}$ runs in the direction "3" or "4", the figure is recognized as "2". In FIG. 16B, the figure is identified as "2" so far as the segment $l_2$ forms an arc clockwise oriented, and $\vec{PQ}$ runs in the direction "3" or "4" or in the other direction but the condition, $l_2/l_1 < 0.25$ is satisfied. This is a manner of distinguishing the figure in FIG. 16B from the figure in FIG. 16A. Further, for the sake of distinguishing the figure in FIG. 16C from that shown in FIG. 16E, recognition of the figure as "2" is made when either the segment $l_2$ defines a straight line and $\vec{PQ}$ ($l_2$) runs in the direction 2 or 3, or the segment $l_2$ defines the straight line and $\vec{PQ}$ ($l_2$) runs in the direction "1" or "8" but a formula $l_2/l_1 < 0.3$ is satisfied.

Figure 19A:
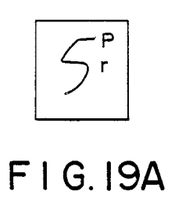
Figure 19B:
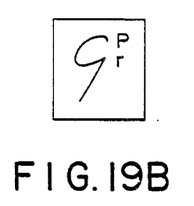

Figures somewhat analogous to each other are shown in FIGS. 19A∼19F. A detailed classification for identifying these figures are described hereinafter. The figures shown in FIGS. 19A and 19B could be readily read up as "5" and "9" by the human eye but not identified by only the aforementioned manner. As seen from FIGS. 19A and 19B, each of the figures is formed of one branch so that the segment may be resolved into two arcs. On the other hand, the maximum point of the arc clockwise (negative) orientated is found by the aforementioned manner and is then designated by a small letter r. It should be noted that the maximum point can be obtained by use of the data before resolution of segment. In this manner, a distance between the end point P and the maximum point $\gamma$ is obtained while magnitude of change at the variation point is evaluated. Although the figure in FIG. 19A shows a slight change adjacent the maximum point, the figure in FIG. 19B represents a violent change adjacent the maximum point, that is, the figure is configurated to include a start point. Under such conditions, the figures "5" and "9" are, however, recognized.

Figure 19C:
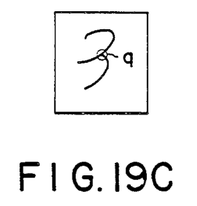
Figure 19D:
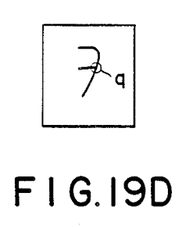
Figure 19E:
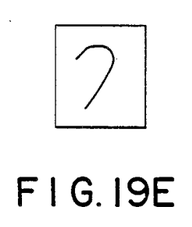
Figure 19F:
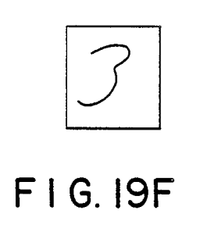

FIGS. 19C and 19D shows the figures "3" and "7", the former being written in a long line extending downwardly and consisting of an arc and two straight lines, thereby looking like what is shown in FIG. 19D. Notwithstanding this, the figure may be identified by microscopically making sure of the direction of the handwriting adjacent a branch point q. If a segment of the figure is expressed by q⊰ or q⊱, this is identified as "3" or "7". The figures "7" and "3" shown in FIGS. 19E and 19F are subjected to a resolution process and resolved into the two such as the arc and the straight line (refer to FIG. 7). In this instance, whether the maximum point of the arc is counter clockwise (positive) oriented or not is determined. If it is counter clockwise oriented, the figure is recognized as "3". If not, it is identified as "7".

In this manner, all the figures analogous to each other as imagined are subjected to a detailed estimation "0" to "9".

As set forth hereinbefore, according to the pattern recognition system of the present invention, each of the handwritten figures is resolved into the elements such as the loop, straight line and the arc for characteristic extraction and is then compared with the pre-registered classification code. When the figure is not, however, defined to one character by the result of comparison, it is subjected to the stroke and balance checks. When it is still not yet defined by these checks, the figure is further checked in the length ratio, the point (maximum point) where curvature is varied, magnitude of variation in curvature, the distance between the two points, and the direction adjacent the branch point as viewed microscopically according to a detailed classification. Consequently, all the figures are efficiently and reliably identified.

What is claimed is:

1. A letter pattern recognition method comprising the steps of:
   preprocessing character patterns;
   extracting characteristic data for the character patterns according to elements including a loop, a straight line and an arc which have branches and nodes;
   obtaining a center of gravity for each of the respective elements;
   normalizing the character patterns by using the extracted characteristic data;
   comparing the normalized character patterns with pre-registered classification codes by allotting relative positions of the loop, straight line and arc elements in accordance with information on the center of gravity thereof and determining if a return check is required depending upon the result of the comparison, and performing a return check and returning to the extracting step if a return check is required;
   performing balance and stroke checking for the normalized patterns in the absence of the requirement for the return check, wherein the balance checking is performed by using a relationship of weight on the relative position and wherein the stroke checking is performed by checking a direction of the straight line elements, a rotational direction of the arc elements and a link structure of the elements; and
   detail-classifying the normalized patterns in such a manner that an orientation of the arc elements, and a length ratio of the elements so as to thereby recognize the character patterns.

2. A letter pattern recognition method as set forth in claim 1, wherein a code with noise and another code without noise are prepared in advance for the classification codes, and wherein when the code with noise is anticipated in establishing the comparison, the comparison is made again after eliminating elements corresponding to unessential elements defined in advance in the code with noise.

3. A letter pattern recognition method as set forth in claim 1, wherein the character patterns are handwritten figures.

4. A letter pattern recognition method as set forth in claim 3, wherein the classification codes are codes including "0"~"9".

5. A letter pattern recognition method as set forth in claim 1, wherein the loop element is extracted by a linear pattern tracing algorithm and refers to a pattern which defines a loop selected from the group of loops consisting of a closed loop and a ring shape loop, said loop being formed by at least one branch.

6. A letter pattern recognition method as set forth in claim 1, wherein there is provided a branch which is formed of two points, and a segment of which is of a length which is the shortest distance md between points A and B, and wherein the branch Ll is recognized as a straight line if the branch tl meets the following inequality:

$$a.md \geq tl$$

where $a$: straight line determining coefficient (for example 1.2)

$$md = \sqrt{2} \times \min(xl, yl) + |xl - yl|$$
$$xl = |x_A - x_B|$$
$$yl = |y_A - y_B|$$

$$tl = \sum_{n=1}^{Cn} Cl_n$$

$C_n$: number of chain code
$Cl_n$:
   1 (chain code stands at 1, 3, 5 or 7)
   $\sqrt{2}$ (chain code stands at 2, 4, 6 or 8).

7. A letter pattern recognition method as set forth in claim 1, wherein the chain codes are designated 1~8 with respect to directions of the straight line.

8. A letter pattern recognition method as set forth in claim 1, wherein the arc element is a characteristic element other than those of the loop and straight line, and has characteristic codes corresponding to divergent orientation and divergent amount.

9. A letter pattern recognition method as set forth in claim 8, wherein if a point A of one end point of the arc element and another point B of another end point thereof are respectively expressed by (xA, yA) and (xB, yB), and a median point M has the coordinates which are formularized by:

$$M\left(\frac{xA+xB}{2}, \frac{yA+yB}{2}\right)$$

and the direction of a segment that connects a point CP with the point M is expressed by:

$$CP \cdot M\left(\frac{xA+xB}{2} - x_{CP}, \frac{yA+yB}{2} - y_{CP}\right) =$$

$$CP \cdot M(xd, yd)$$

where $xd = \frac{xA+xB}{2} - x_{CP}$ $yd = \frac{yA+yB}{2} - y_{CP}$ the point CP is a median point of the arc element whose end points are A and B wherein d=yd/xd is given, and then a divergent orientation n of the arc is formularized by $$\begin{cases} n = 1: xd > 0, d \geq 2.414; xd < 0, d < -2.414; xd = 0, yd > 0 \\ n = 2: xd > 0, 0.414 \leq d < 2.414 \\ n = 3: xd > 0, -0.414 \leq d < 0.414 \\ n = 4: xd > 0, -2.414 \leq d < -0.414 \\ n = 5: xd > 0, d < -2.414; xd < 0, d \geq 2.414; xd = 0, yd < 0 \\ n = 6: xd < 0, 0.414 \leq d < 2.414 \\ n = 7: xd < 0, -0.414 \leq d < 0.414 \\ n = 8: xd < 0, -2.414 \leq d < -0.414 \\ n = 9: x = y = 0. \end{cases}$$

10. A letter pattern recognition method as set forth in claim 1, wherein the branches other than those that form the loop elements are employed as single branches, and wherein output data including all data regions, respective numbers of loops, straight lines and arcs, and a ratio for the loop, straight line and arc elements are stored when the single branches are completely processed.

11. A letter pattern recognition method as set forth in claim 10, wherein a determination as to whether or not a segment is a straight line is made when a single branch has not yet been processed to a full extent, and wherein the single branch is subjected to a straight line process for processing the straight line when it is determined to be a straight line, and wherein a determination is made as to whether or not the single branches number more than two, and wherein the single branches are subjected to an arc process for processing the arc when the single branches number more than two.

12. A letter pattern recognition method as set forth in claim 11, wherein when the number of single branches is one, arc and loop flags for processing the arc and loop are respectively set equal to ON and OFF.

13. A letter pattern recognition method as set forth in claim 12, wherein the branch is subjected to a separation process for separating the branch when neither the arc nor loop flags have been set equal to OFF.

14. A letter pattern recognition method as set forth in claim 13, wherein the separation process is a process that separates a pattern formed by only one branch and is not a straight line into two elements.

15. A letter pattern recognition method as set forth in claim 14, wherein a determination as to whether or not one separated element of the two separated elements is a straight line is initially made after the separation process, and wherein the separated element is subjected to the straight line process when the element is determined to be straight line, and wherein the separated element is subjected to the arc process when it is determined to be non-rectilinear, and the other separated element of the two separated elements is then subjected to the same arc process.

* * * * *